March 4, 1969   J. W. EDMING   3,430,788
SILAGE DISTRIBUTOR
Filed March 8, 1967
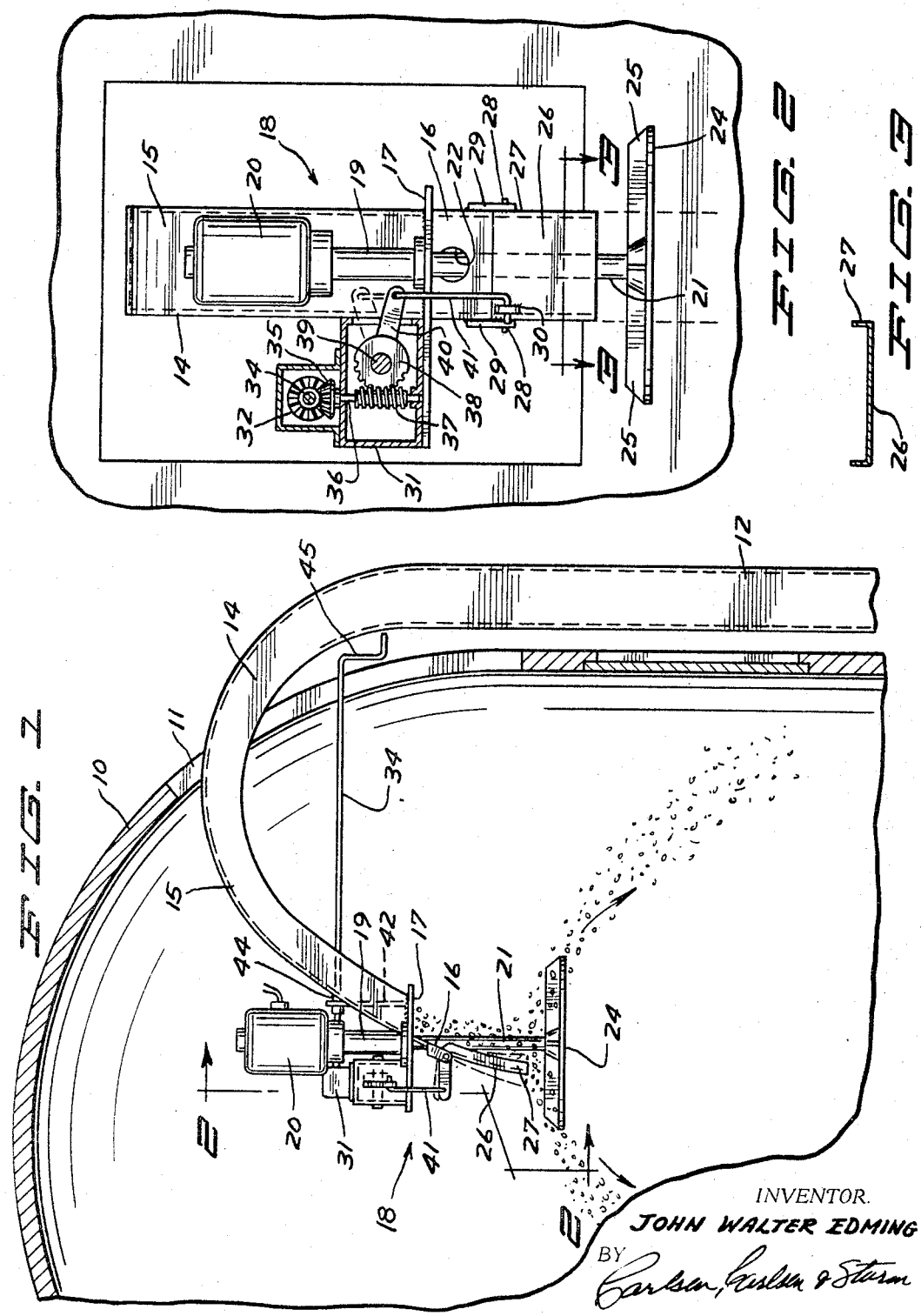
INVENTOR.
JOHN WALTER EDMING
BY
Carlsen, Carlsen & Sturm
ATTORNEYS United States Patent Office 3,430,788
Patented Mar. 4, 1969

3,430,788
SILAGE DISTRIBUTOR
John Walter Edming, P.O. Box 83,
Glen Flora, Wis. 54526
Filed Mar. 8, 1967, Ser. No. 621,662
U.S. Cl. 214—17                        1 Claim
Int. Cl. B65g 65/30; A01c 17/00

ABSTRACT OF THE DISCLOSURE

An apparatus for mounting at the discharge end of a silo filler tube and having a rotary distributor plate for broadcasting the silage around the silo and an adjustable guide plate for guiding the silage against the desired portion of the distributor plate to vary the area of distribution.

---

The present invention may be used in combination with the structure disclosed in my copending application Ser. No. 494,614, filed Oct. 11, 1965, now United States Patent No. 3,305,108. It will be obvious, however, that the two inventions may also be used independently of each other.

This invention relates generally to mechanism for uniformly filling a silo with silage and more particularly to a silage distributor which can be selectively adjusted for uniform distribution of various types of silage.

In silo loading it is common practice to blow the silage upwardly through an arched feeder pipe having its discharge end disposed at or near the axial center of the silo. It is also common to mount some sort of a rotary distributor plate below the discharge end of the pipe which broadcasts the silage radially throughout the silo as it falls thereupon. The aforementioned patent describes an improvement in this type of distributor in the form of a hood mounted over the distributor plate and which is universally adjustable to partially control the direction of silage distribution as it leaves the distributor plate.

While the adjustable hood solves many problems of uniform distribution, it is found that it is also important to provide some means for controlling the flow of silage from the discharge end of the filler tube onto the distributor plate to adjust for different conditions of moisture in the silage.

The primary object of the present invention is to provide such a means for controlling the flow of silage onto the distributor plate. With this object in mind the invention broadly comprises a silage distributor adapted to be mounted within a silo at the discharge end of a silo filler tube and having a rotary distributor plate disposed below said discharge end to radially distribute silage throughout the silo, and an adjustable guide member mounted on the tube for directionally guiding silage from the tube onto the distributor plate.

During the course of the following specification, reference will be made to the accompanying drawing, in which:

FIG. 1 is a fragmentary vertical section through the upper portion of a silo showing a filler tube extending thereinto and with my improved silage distributor mounted on the discharge end of the tube and shown in elevation. Two different possible positions of the guide plate are respectively shown in solid and broken lines.

FIG. 2 is an enlarged side elevation of the distributor, partially in section, taken along line 2—2 of FIG. 1.

FIG. 3 is a horizontal section taken on line 3—3 of FIG. 2 looking downwardly.

Referring now more particularly to the drawings, reference numerals will be used to denote like parts or structural features in the different views. The silo denoted generally at 10 has an opening 11 near the top thereof. A silo filler tube 12 extends upwardly along the outside of silo 10 and arches inwardly as at 14 toward the center of the silo. The arched tube portion 14 is inverted channel shape in cross section with a curved outer or top wall 15 along which the silage material entering through the tube slides. Wall 15 extends downwardly beyond the discharge end of the tube at an angle as denoted at 16.

A horizontal distributor support frame or platform 17 is mounted on the inner end of tube portion 14. A distributor unit, designated generally at 18, is mounted on platform 17. This unit comprises a tubular standard 19 mounted vertically on platform 17 and supporting an electric motor 20 at its upper end which drives a shaft 21 extending downwardly through the standard 19 and an aperture 22 in wall extension 16 and is centrally connected at its lower end to a rotary distributor plate 24. Plate 24 is provided with radially extending vanes 25 on its upper surface.

A guide plate 26 of channel construction and having side walls 27 is hinged as by pins 28 to ears 29 mounted on the lower end of extension 16. Arm 30 is mounted to extend outwardly from the side of plate 26 remote from shaft 21.

Means are provided for adjusting the angle of dependency of plate 26 from the pins 28. A gear housing 31 is mounted on platform 17. Disposed within the housing is a bevel gear 32 mounted at the end of an elongated crank 34 and in meshing engagement with a second bevel gear 35 mounted at the upper end of vertical shaft 36 journaled within the housing. A worm gear 37 keyed to shaft 36 meshes with gear segment 38 journaled on shaft 39 and having an integral lever arm 40, the extended end of which is connected to arm 30 as by a link 41. An upright support 42 on platform 17 carries a bearing 44 at its upper end which journals crank 34 and supports the same in horizontally extending position with the handle 45 thereof adjacent to the silo opening 11.

It will be understood that as the crank 34 is rotated in one direction gears 32, 35 and 37 will be rotated to move the segment 38 clockwise on shaft 39 (as viewed in FIG. 2) to lower link 41 and move the guide plate 26 inwardly toward shaft 21. Conversely, and through the same train of gears as the crank 34 is rotated in the opposite direction, link 41 will be raised to adjust plate 26 outwardly in a direction away from shaft 21.

As silage is blown upwardly into the silo through the feeder pipe 12 it will move inwardly along the arched upper wall 15 and then downwardly past platform 17, which has an opening (not shown) aligned with the pipe passageway, along the extension 16, and fall upon the whirling distributor plate 24 which radially broadcasts the silage to distribute it throughout the silo. A universal hood of the type disclosed in my aforementioned patent may be used to selectively control the direction of distribution from plate 24.

The purpose of the deflector or guide plate 26 is to control the flow of silage onto the rotary plate 24 and its adjusted position relative to shaft 21 is dependent to a great extent on the moisture content and weight of the silage being loaded.

Having now therefore fully illustrated and described my invention, what I claim to be new and desire to protect by Letters Patent is:

1. In a silage distributor for mounting on a silo filler tube extending into a silo, said tube having a discharge end portion with an arched upper wall connecting opposing side walls so that silage entering the silo through said tube will move along said upper wall and be discharged downwardly from the inner end thereof, (a) a power driven rotary distributor plate disposed below said tube discharge end portion for rotation on a vertical axis,
(b) a cross sectionally channel-shaped guide plate disposed in upright position above the distributor plate at one side of said vertical axis in alignment with the inner end portion of said upper wall and having its upper end pivotally connected to the discharge end portion of the tube on a horizontal axis for movement of the guide plate toward and away from said vertical axis, and
(c) control means for adjusting the guide plate to and holding it in any selected position about said horizontal axis between inner and outer limits to guide silage as it is discharged from said upper wall onto any desired radial area of said distributor plate.

References Cited

UNITED STATES PATENTS

| | | | |
|---|---|---|---|
| 2,856,191 | 10/1958 | Kolb | 239—665 X |
| 3,158,407 | 11/1964 | Cymara | 302—60 |
| 3,305,108 | 2/1967 | Edming | 214—17 |

ROBERT G. SHERIDAN, *Primary Examiner.*

U.S. Cl. X.R.

239—665